March 6, 1962 G. Q. BOGNER 3,023,486
GIANT MILL
Filed Oct. 12, 1959 4 Sheets-Sheet 1
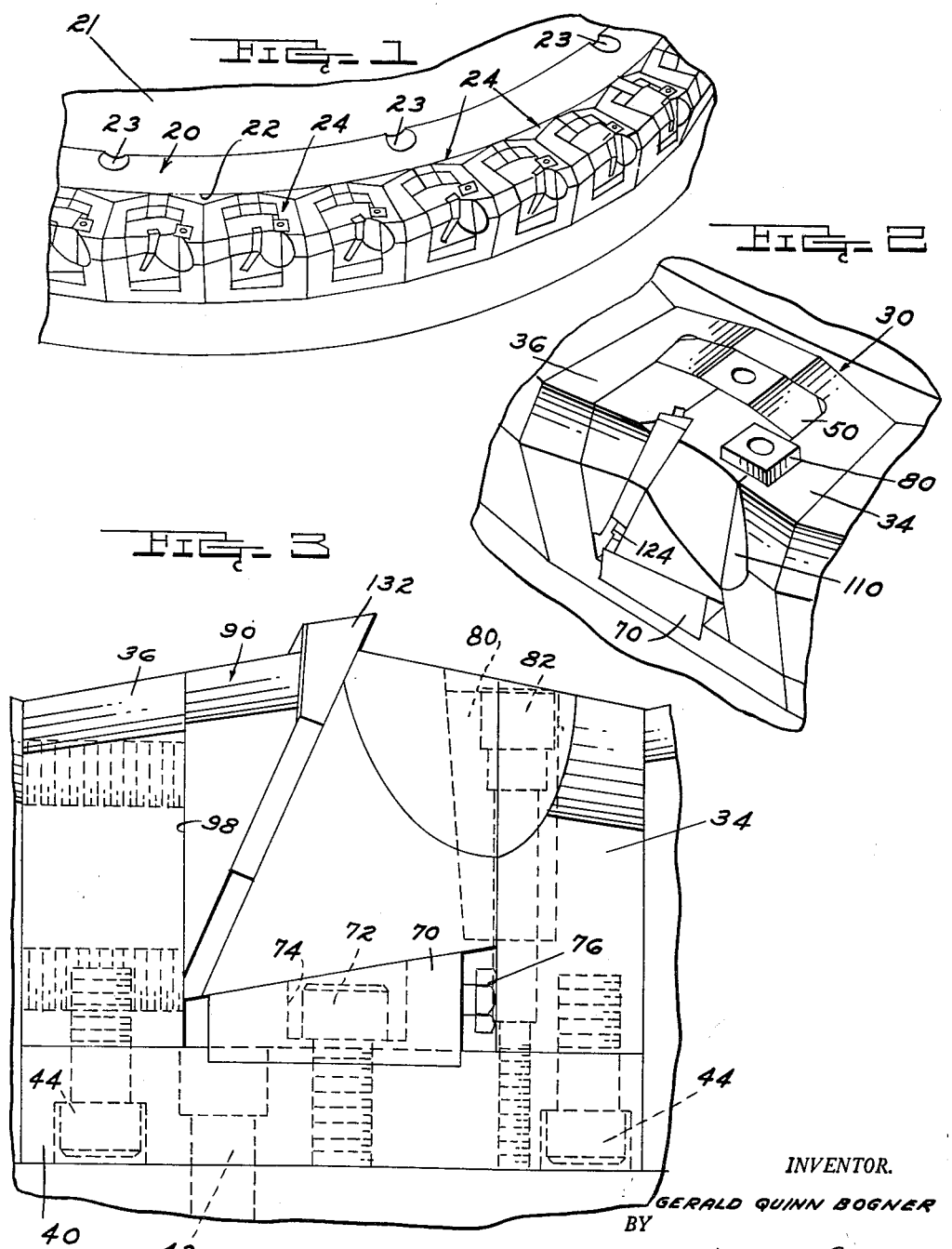
INVENTOR.
GERALD QUINN BOGNER
BY
Barnes, Kisselle, Raisch & Choate
ATTORNEYS

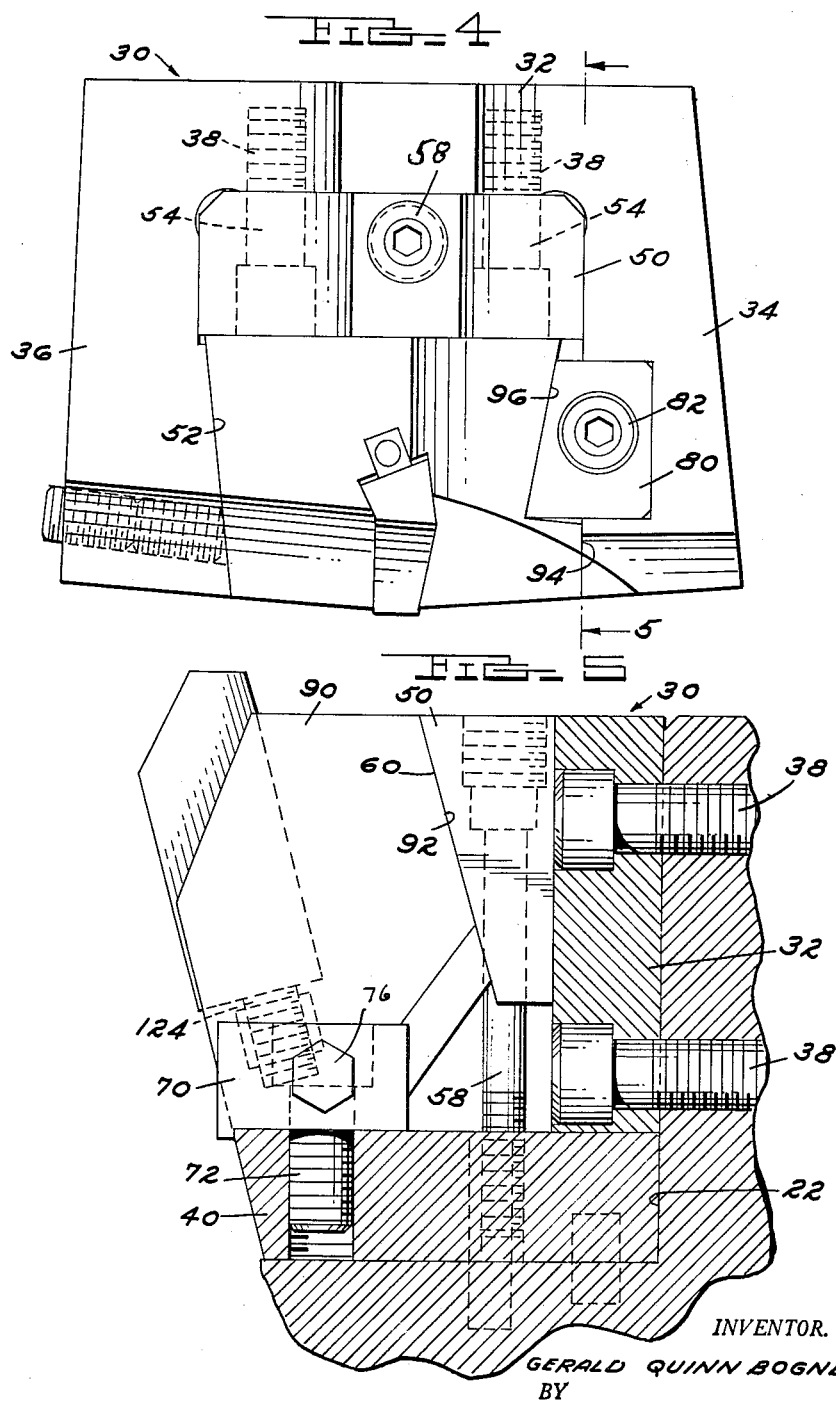

March 6, 1962 G. Q. BOGNER 3,023,486
GIANT MILL
Filed Oct. 12, 1959 4 Sheets-Sheet 3
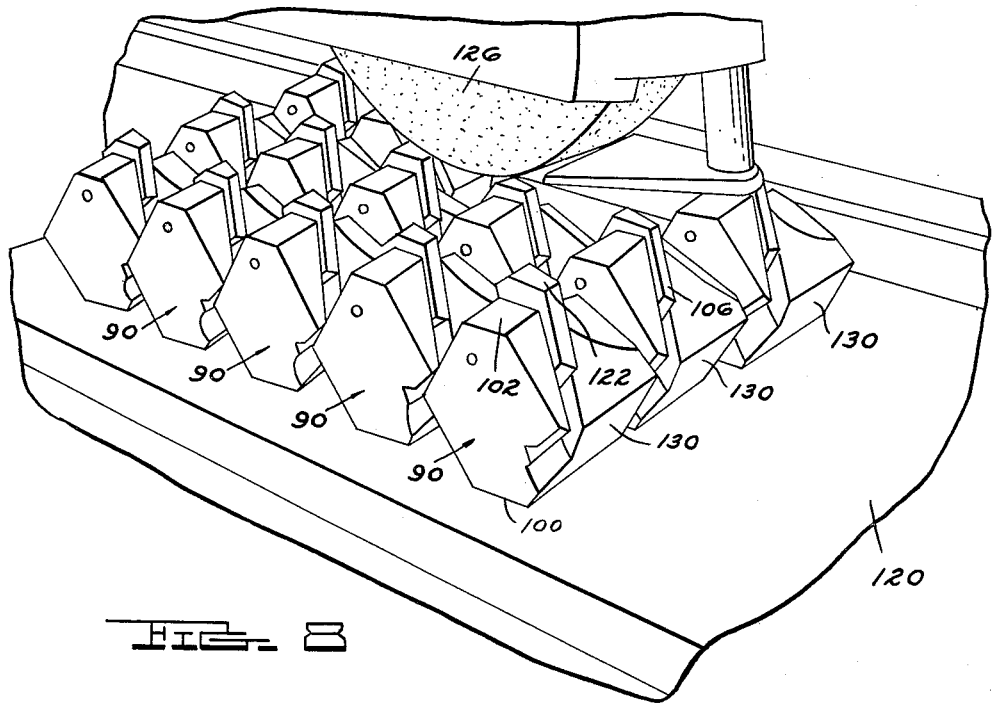
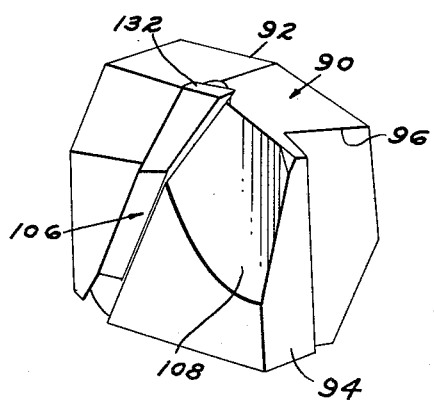
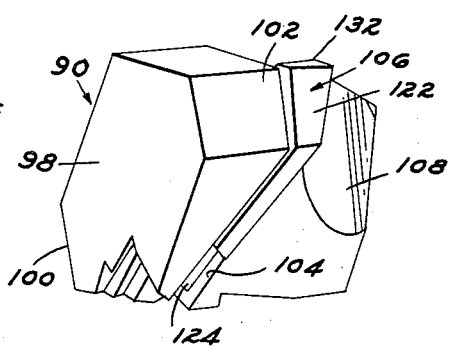
INVENTOR.
GERALD QUINN BOGNER
BY
Barnes, Kisselle, Raisch & Choate
ATTORNEYS

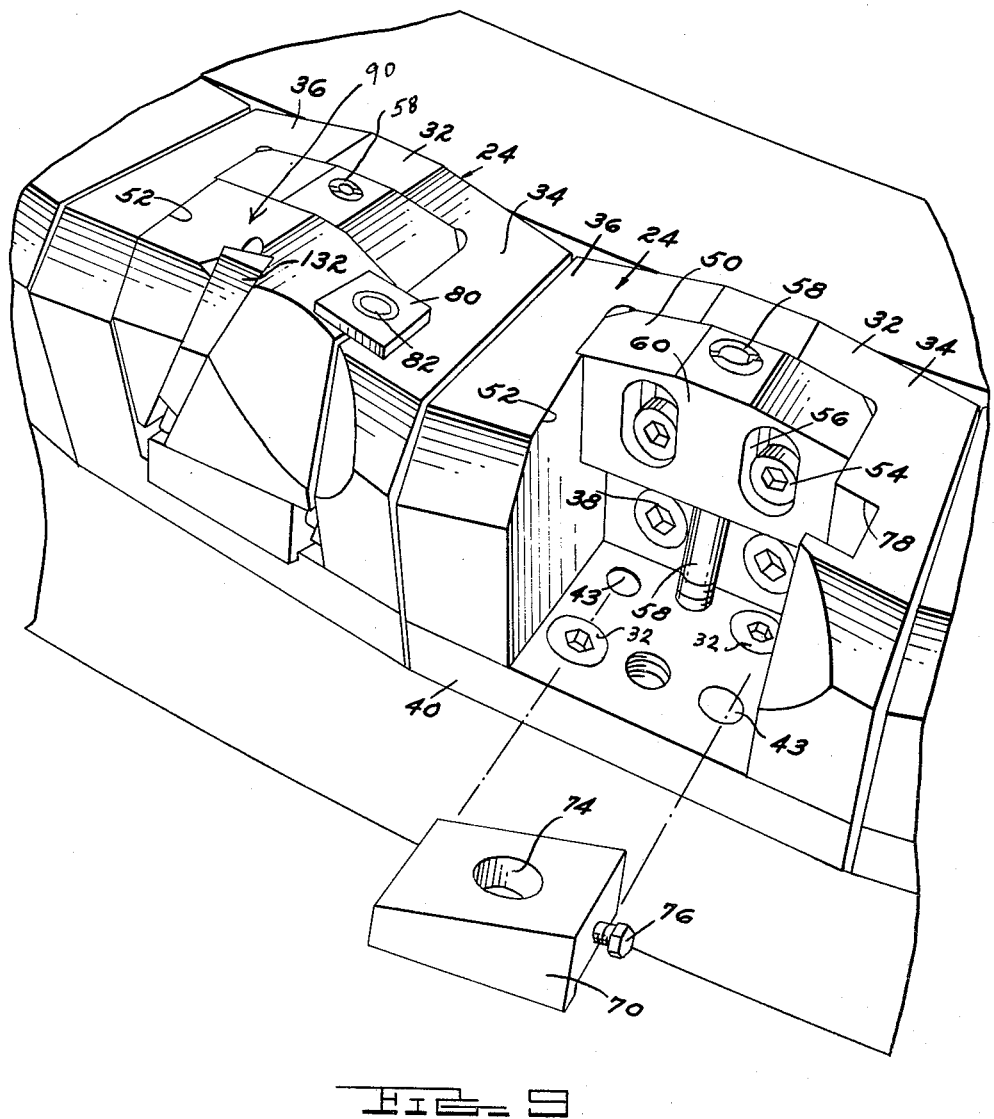

United States Patent Office 3,023,486
Patented Mar. 6, 1962

3,023,486
GIANT MILL
Gerald Quinn Bogner, Bay Village, Ohio, assignor, by mesne assignments, to Wesson Corporation, Ferndale, Mich., a corporation of Delaware
Filed Oct. 12, 1959, Ser. No. 845,830
9 Claims. (Cl. 29—105)

This application relates to a giant face mill. In recent years one of the new products that has increased greatly in its production is aluminum foil, this being used in households to a much greater degree than previously.

Aluminum foil is manufactured from an aluminum billet which is hot rolled into foil.

The original billet may weigh up to seven tons, and before it is hot rolled, it is necessary that it be milled on both sides to remove scale and imperfections.

In conventional equipment only one side of a billet is milled at a time and frequently in the handling of a billet in a machine of this type, the machined surface can be scratched and cause a great deal of damage in the foil as it is produced.

Also, in view of the need for high production, the present methods are too slow.

It is an object of the present invention to provide a milling cutter which can be used to mill both sides of the billet at the same time with two spaced, facing cutters, thus eliminating the turning over of a heavy billet and insuring a smooth surface on all sides prior to hot rolling. To cover a billet of this kind, it was necessary to go to cutters of extremely large diameters, having, for example, a 75 inch diameter with cuts of around ⅝ of an inch at feeds of 160 or more inches per minute. One-thousand horsepower motors are used to drive these milling cutters and as a result, the milling cutters must be accurately set up and there must be means provided to grind the cutting blades when they become dull.

In the present invention this problem has been solved by providing a plurality of removable pockets adjacent the periphery of the cutter, these pockets being especially designed to receive blade magazines carefully constructed to be set in the pocket and also constructed to permit gang grinding of blades in these magazines by a simple surface grinding operation. When installed, the magazines automatically preset all cutting edges without any need for gauging or grinding of the cutter blade itself. With this arrangement, it has been possible to reduce grinding time from about 100 hours to 2 hours and the set up time has been reduced from about 15 hours to 45 minutes. The pockets for the blade magazines are designed to have suitable adjustments to compensate for wear and a three-way locking device is provided to insure accurate and tight locating of the magazines in the pockets.

Other objects and features of the invention relating to details of construction and operation will be apparent in the following description and claims.

Drawings accompany the disclosure and the various views thereof may be briefly described as:

FIGURE 1, a perspective view of the cutter mount and cutter ring showing the relative position of the cutter holders.

FIGURE 2, an enlarged view showing a side and top elevation of the cutter holder.

FIGURE 3, a front elevation of the cutter as mounted in the body.

FIGURE 4, a top view of the mounting block assembly.

FIGURE 5, a sectional view radially of the body showing the relationship of the mounting block to the socket of the body.

FIGURE 6, a perspective view of the front and one end of the blade mounting block.

FIGURE 7, a perspective view of the front and the other end of the blade mounting block.

FIGURE 8, a perspective view of the plurality of the mounting blocks on a magnetic chuck positioned for grinding.

FIGURE 9, a perspective view of the mounting boxes, one without a blade magazine and one complete.

Referring to the drawings:

The cutter body is shown segmentally in FIGURE 1, this body comprising a large circular mass of material having a diameter of approximately 75 inches. This body is in the form of a ring 20 which is suitably mounted on a carrying disc 21 for rotation in a slabbing machine.

The ring 20 has an annular groove 22 on one face and holes 23 for mounting bolts. Packed into the annular groove 22 are a plurality of pocket housings or boxes 24, each formed of a U-shaped member 30 having a back plate 32 with two forward projecting legs 34 and 36 extending to the periphery of the ring. The outer walls of these legs are disposed at an angle as shown particularly in FIGURE 4 so that they will nest with adjacent and similar bodies around the periphery of the ring. The U-shaped body 30 is held in place in the ring by bolts 38 which are anchored in the ring and this body is mounted on top of a bottom plate 40 held in place by anchor bolts 42 and suitable locating pins 43. The base plate 40 is anchored to the U-shaped body 30 by bolts 44 extending upwardly to the side walls 34 and 36 respectively.

Two shiftable locating blocks are mounted in the box assembly 24, one block 50 being mounted at the axial base surface of the pocket opening 52 in the U-shaped body 30. This block 50 is held against the back wall 32 by bolts 54 passing through slotted openings 56 in the block 50. This adjustable block 50 is controlled in its position by a double shoulder screw 58 anchored in base 40. The forward face of the block 50 is angled at 60 as shown in FIGURE 5 to govern the radial position of the locating surface 60 depending on the vertical position of block 50. Mounted on the radial base surface of the box 24 on the bottom plate 40 is a mounting wedge block 70 held down by a bolt 72 in a slotted recess 74. The end wise position of the wedge block 70 is controlled by an adjustment screw 76 which backs up against the inside wall of the side 34 of the mounting block. Thus the mounting ring 20 has spaced in the annular groove 22 a plurality of cup-like openings or pockets formed by the box members 24 composed of U-shaped members 30 in conjunction with the bottom 40 which is fastened thereto. The inner wall of the side 34 has a wedge recess 78 to receive a wedge 80 movable into place by a screw 82.

The wedge 80 is positioned to lock into place a secondary mounting block or blade magazine 90. The secondary mounting block or blade magazine 90 has an extremely irregular shape shown best in FIGURES 6, 7 and 8. The back wall 92 of the block 90 is adapted to be positioned against the surface 60 of the adjustable locator block 50 as shown in FIGURE 5. The end wall 94 of the block shown in FIGURE 6 has an angled notch 96 to receive the previously mentioned wedge 80. The other end wall 98 lies up against the inner wall of side 36 of the mounting block 30.

A short corner wall 100 on the bottom of the block 90 opposes another corner wall 102 at the top, these walls being substantially parallel and between the end walls is a blade slot 104 for receiving a blade 106 of cutting material such as high speed steel, tungsten carbide, Stellite or any other suitable cutting material for the material to be processed. Chip clearance is provided by a recess 108 which extends to a recess 110 in the wall 34. The mounting block or magazine 90 is mounted in the box 24 and positioned as previously described by the wedge block 70 and the rear block 50. The block 90 is held in place securely by the wedge 80 which is driven in by the screw 82.

As shown in FIGURE 8, the blocks 90 can be positioned with the surfaces 100 flat on a magnetic chuck surface 120 which brings the cutting surfaces 122 of the blades 106 parallel to the cutting surface 120. Thus the worn blades can be adjusted outwardly by an adjustment screw 124 and then the blades can be ground so that the surfaces are identical by passing a surface grinding wheel 126 over the various blades and blocks.

When the blades are lying on the surface 130, see FIGURE 8, the corner surfaces 132 of the blade are parallel to the surface 130 so that the surface of the blade can be easily ground on a magnetic chuck.

It will thus be seen that the cutting surfaces of the blades 106 can be readily and accurately ground and in such a manner that the dimensions of the blades relative to the blocks 90 are all identical. The blocks 90 can then be placed in the mounting boxes 24 and accurately positioned by the adjustable blocks 50 and 70 so that when the wedges 80 are tightened down, the unit is ready for operation. After the initial adjustment of blocks 50 and 70, the gauged and ground blades will always fall into the same location after grinding due to the accurate and simultaneous grinding operation.

Thus, despite the huge dimensions of the cutting device, it can be controlled in accuracy to that of a small milling cutter and thus the aluminum billets that are thus treated can be provided with a fine surface which permits rolling of foil without loss due to surface defects.

I claim:

1. A giant milling cutter for slabbing of large billets of aluminum and the like which includes a body comprising an annular ring and means for mounting said ring for circular motion, said ring having at one of its edges an annular recess with axially extending and radially extending walls merging at an angle, a plurality of mounting boxes nested around said ring in said annular groove positioned directly adjacent each other, each of said boxes having a pocket opening outwardly of said ring, said pocket having a radial base surface and an axial base surface, adjustable means on said base surfaces shiftable to provide an adjustable but fixed supporting surface, and a plurality of blade blocks mounted in said box openings, each blade block having a surface to contact the adjustable surfaces on said base surfaces, said blade blocks having a blade recess extending to an outer corner of said blade blocks, a blade in said blade recess, means for adjustably positioning said blade in said blade recess relative to said blade block, and means for locating and locking said blade block in said mounting box.

2. A giant milling cutter for slabbing of large billets of aluminum and the like which comprises a body having a circular circumference and an annular groove in said circumference open to one side and to the outer surface of said body, a plurality of mounting boxes in said groove spaced around said body, each of said boxes having a recess opening outwardly, a plurality of blade blocks mounted each in a recess of said mounting boxes, means between the blade blocks and the walls of said recesses for adjustably positioning said blade blocks in radial and axial directions relative to said body, a cutting blade adjustably locked in each of said blade blocks having a cutting surface, and means on each of said mounting boxes for locking said blocks in said recesses.

3. A device as defined in claim 2 in which said blade blocks have surfaces parallel to the cutting surface of said blade wherein said blocks may be positioned with said surfaces flat on a holding platform so that cutting surface of the blades may be ground simultaneously in a straight horizontal motion.

4. A device as defined in claim 2 in which the means for adjustably positioning the blade blocks comprises movable blocks positioned on two walls of the recesses of said mounting boxes, said blocks being shiftable to position the blade blocks at a predetermined distance from the center of the body and in axially adjusted position.

5. A device as defined in claim 2 in which the means for adjustably positioning the blade blocks comprises tapered blocks movably disposed on a radial and an axial surface of said recesses and adapted to rest in contact with the blade block to position it relative to the body, said tapered blocks having slotted holes to permit adjustment, and headed bolts passing through said holes to lock said blocks in position.

6. A device as defined in claim 2 in which the mounting boxes are composed of a U-shaped member having its base mounted against the axial surface of the annular groove and a base member positioned below said U-shaped member having its base mounted against the radial face of the annular groove, said U-shaped member and said base member being fastened together and solidly secured to said body.

7. A device as defined in claim 2 in which the locking means for the blade block comprises a wedge slidably fitted in a slot in one wall of said mounting box and also in an opposed groove in said blade block, and means for moving said wedge downwardly to lock said blade block in said box.

8. A giant milling cutter for slabbing of large billets of aluminum and the like which comprises a circular body, a plurality of blades having cutting surfaces, said blades to be mounted at a compound angle to the axis of said body, a primary mount block for said blades having a slot in which are mounted said blades, means in said block adjustably positioning said blades, a secondary mount for each of said blades comprising a mounting box for said blocks, said mounting boxes each being affixed to said body in circumferentially spaced relation and having recesses in which are positioned said mount blocks, and means on said mounting boxes locking said blocks in adjusted position relative to said body.

9. A device as defined in claim 8 in which the mount blocks have locating surfaces to abut locating surfaces in said mounting boxes and additional surfaces connecting said locating surfaces, some of said surfaces being parallel to a cutting surface of said blades to permit uniform positioning of said cutting surfaces of said blades in a plane for grinding.

References Cited in the file of this patent

UNITED STATES PATENTS

| | | |
|---|---|---|
| 1,405,474 | Yehle | Feb. 7, 1922 |
| 2,893,111 | Dedekind | July 7, 1959 |